US012792050B2

(12) United States Patent
Ohira et al.

(10) Patent No.: US 12,792,050 B2
(45) Date of Patent: Nov. 10, 2026

(54) INFORMATION PROCESSING APPARATUS, INFORMATION METHOD, AND STORAGE MEDIUM

(71) Applicant: CANON KABUSHIKI KAISHA, Tokyo (JP)

(72) Inventors: Shinji Ohira, Tokyo (JP); Masakazu Fujiki, Kanagawa (JP); Akiteru Naka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 19/034,019

(22) Filed: Jan. 22, 2025

(65) Prior Publication Data

US 2025/0284286 A1 Sep. 11, 2025

(30) Foreign Application Priority Data

Mar. 7, 2024 (JP) ................................ 2024-034485

(51) Int. Cl.
*G05D 1/43* (2024.01)

(52) U.S. Cl.
CPC .................................... *G05D 1/43* (2024.01)

(58) Field of Classification Search
CPC .. G05D 1/43; G05D 2105/10; G05D 2107/17; G05D 2109/10; G05D 1/644; G05D 1/229; G05D 1/2295; G05D 1/2297; G05D 1/0005; G05D 1/0217; A47L 11/4011; G06Q 10/20; G05B 2219/45084
See application file for complete search history.

(56) References Cited

U.S. PATENT DOCUMENTS

| | | | | |
|---|---|---|---|---|
| 2020/0290210 | A1* | 9/2020 | Ha | B25J 13/087 |
| 2023/0286565 | A1* | 9/2023 | Armbrust | B62B 5/0076 |
| 2023/0322545 | A1* | 10/2023 | Itoh | B60L 53/36 141/94 |
| 2023/0342956 | A1 | 10/2023 | Ohira | |
| 2024/0142982 | A1 | 5/2024 | Fukamachi | |
| 2024/0160213 | A1 | 5/2024 | Numakami | |
| 2024/0184292 | A1 | 6/2024 | Ohira | |

FOREIGN PATENT DOCUMENTS

JP 2022-50248 A 3/2022

OTHER PUBLICATIONS

U.S. Appl. No. 19/069,497, filed Mar. 4, 2025 by Yohei Shiraki.

* cited by examiner

*Primary Examiner* — Bao Long T Nguyen
(74) *Attorney, Agent, or Firm* — VENABLE LLP

(57) ABSTRACT

An information processing apparatus is configured to perform processing to control a movement of a robot in a case where the robot is sequentially moved to a plurality of locations to provide a service. The information processing apparatus includes a processor configured to acquire first information indicating whether the robot can stand by each of the locations after or before the service is provided, and make a determination regarding the movement of the robot after the service is provided, based on the first information.

20 Claims, 4 Drawing Sheets

| (a) USER ID | (b) STANDBY AVAILABILITY | (c) SERVICE CONTENT | (d) DEMAND IN SURROUNDING REGION | (e) CHARGING AVAILABILITY | (f) DUST DISPOSAL AVAILABILITY |
|---|---|---|---|---|---|
| 1 *CURRENT USER | N/A | SWEEPING | MEDIUM | - | - |
| 2 | AVAILABLE | SWEEPING | LOW | N/A | N/A |
| 3 | N/A | SWEEPING | HIGH | - | - |
| 4 | AVAILABLE | SWEEPING | HIGH | AVAILABLE | N/A |
| 5 | AVAILABLE | WET MOPPING | MEDIUM | AVAILABLE | AVAILABLE |

FIG. 5

INFORMATION PROCESSING APPARATUS, INFORMATION METHOD, AND STORAGE MEDIUM

BACKGROUND

Technical Field

The present disclosure relates to the information processing technology for a robot dispatch service.

Description of Related Art

Robot as a Service (RaaS) is used to dispatch a robot to a service (provision) location designated by a user to provide a variety of services. For example, a robot that has been standing by at a station (standby base) is moved to a service location designated by the user at the service time to provide the service. In a case where the service is completed, the robot is returned to the station during the free time until the next service time. Thereafter, at the next service time, the robot is moved from the station to the next service location to provide the service.

Japanese Patent Application Laid-Open No. 2022-050248 is not related to RaaS, but discloses a system that suggests a user as a worker to move to a location for the next work during the free time after the previous work ends, based on information about the schedule of the user. The robot dispatch service can also directly move the robot from the previous service location to the next service location during free time.

However, even if the robot moves directly from the previous service location to the next service location during the free time, the robot may not be allowed to stand by at the next service location before the next service time. In such a case, the robot is forced to return to the station once, and unnecessary robot movement occurs.

SUMMARY

An information processing apparatus according to one aspect of the disclosure is configured to perform processing to control a movement of a robot in a case where the robot is sequentially moved to a plurality of locations to provide a service. The information processing apparatus includes a processor configured to acquire first information indicating whether the robot can stand by each of the locations after or before the service is provided, and make a determination regarding the movement of the robot after the service is provided, based on the first information. An information processing method corresponding to the above information processing apparatus also constitutes another aspect of the disclosure. A storage medium storing a program that causes a computer to execute the above information processing method also constitutes another aspect of the disclosure.

Further features of various embodiments of the disclosure will become apparent from the following description of embodiments with reference to the attached drawings.

BRIEF DESCRIPTION OF THE DRAWINGS

FIG. 5 is a table illustrating a user-provided condition for each user in this embodiment.

DETAILED DESCRIPTION

Figure 1:
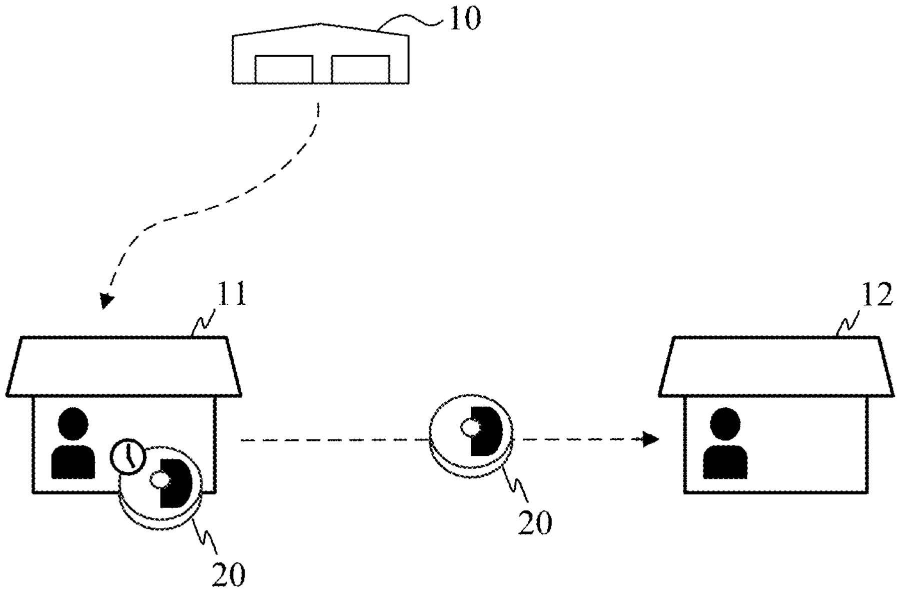
FIG. 1 illustrates the movement of a robot in this embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

This embodiment will discuss a robot dispatch system that provides a cleaning service using a cleaning robot (robotic vacuum cleaner) as an example of a robot dispatch service. In the robot dispatch system according to this embodiment, a service provider (robot dispatch company) that accepts a service request from a user dispatches the cleaning robot to a service location designated by the user at a time designated by the user, and provides the cleaning service using the cleaning robot. The service location is generally, but is not limited to, a user-managed location managed by the user, and may be a location managed by a person other than the user or a public location.

In a case where the service provider receives service requests at a plurality of service locations, the service provider dispatches cleaning robots to these service locations in order at different time. If the robot is always returned to the station that is the robot station for the service provider every time the service at the service location is completed, the travel time to the station and the power required for travel may be wasted. Accordingly, in this embodiment, in a case where the robot can stand by (in other words, stay) at the previous or next service location, the robot is to stand by at the service location. Thereby, unnecessary travel of the robot to the station can be avoided.

FIG. 1 illustrates an example travel (movement) of the robot 20 in the robot dispatch system according to this embodiment. In a case where the service provider receives a plurality of service requests from the same or different users, the robot 20 moves autonomously from a station 10 to a first service location (first location: the user's house, etc.) 11 and starts cleaning from the designated time.

In a case where cleaning at the service location 11 is finished, the robot 20 moves to a next service location (second location) 12 and starts cleaning from the designated time. Now assume that the free time between the end time of cleaning at the first service location 11 and the start time of cleaning at the next service location 12 is longer than the travel time for the robot 20 to travel from the service location 11 to the service location 12.

At this time, in a case where the robot 20 can stay at the service location 11 after cleaning at the first service location 11 is finished, the robot 20 stands by at the service location 11. In FIG. 1, the standby state is illustrated by a clock. The robot 20 moves autonomously to the service location 12 at the time corresponding to the travel time before the start time of cleaning at the next service location 12. Thus, the robot 20 moves directly from the service location 11 to the service location 12 after completing cleaning at the service location 11, without returning to the station 10.

Figure 2:
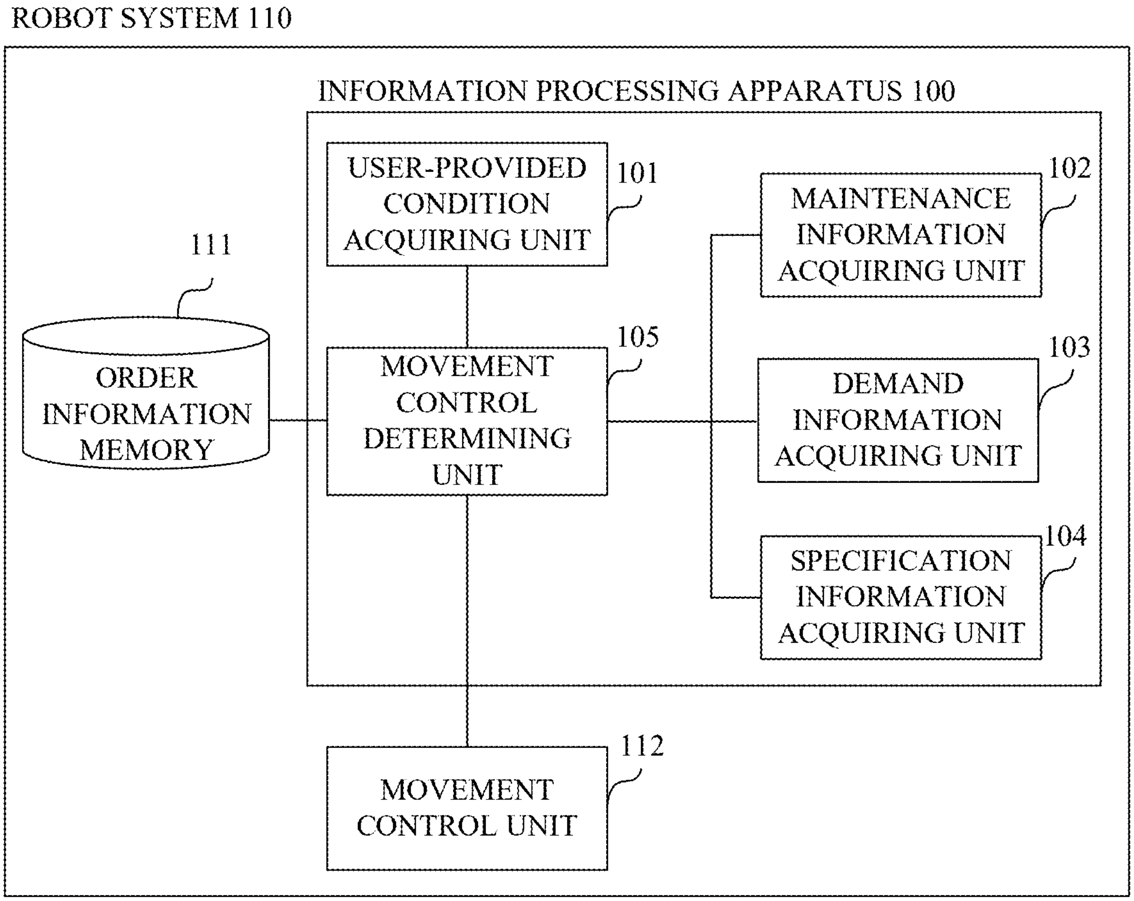
FIG. 2 is a block diagram illustrating the configuration of a robot system including an information processing apparatus according to this embodiment.

FIG. 2 illustrates the configuration of a robot system 110 including the information processing apparatus 100 according to this embodiment. The robot system 110 includes the information processing apparatus 100, an order information memory 111, and a movement control unit 112. The information processing apparatus 100 is communicatively connected to the order information memory 111 and the movement control unit 112.

The information processing apparatus 100 includes a user-provided condition acquiring unit 101, a maintenance information acquiring unit 102, a demand information acquiring unit 103, a specification information acquiring unit 104, and a movement control determining unit 105. The user-provided condition acquiring unit 101, the maintenance information acquiring unit 102, the demand information acquiring unit 103, and the specification information acquiring unit 104 corresponding to an acquiring unit, and the movement control determining unit 105 corresponds to a determining unit.

The user-provided condition acquiring unit 101 acquires an action (benefiting the service provider) that the user can provide to the robot in a case where the user receives a service from a robot dispatched by the service provider as a user-provided condition (first and second information). Details of the user-provided condition will be described later. The user-provided condition acquiring unit 101 acquires a user-provided condition for each of a plurality of service locations. The user-provided condition acquiring unit 101 then outputs the information on the user-provided condition to the movement control determining unit 105.

The maintenance information acquiring unit 102 acquires information on the types of maintenance necessary for the robot and the necessity degree for each type of maintenance as maintenance information, and outputs the maintenance information to the movement control determining unit 105.

The demand information acquiring unit 103 acquires information (third information) for predicting demand for services in the surrounding area of the service location as demand information, and outputs the demand information to the movement control determining unit 105.

The specification information acquiring unit 104 acquires, as specification information (fourth information), information indicating the service providing ability of the robot dispatched by the service provider, and outputs the specification information to the movement control determining unit 105.

The order information memory 111 stores, as order information, information on the service order from the user accepted by the service provider.

The movement control determining unit 105 makes a determination regarding the movement of the robot, including the destination of the robot, based on the user-provided condition, maintenance information, demand information, specification information, and order information, generates control information, and outputs the control information (determination result) to the movement control unit 112. The destination of the robot includes the current location (such as the first location as the destination after the service is provided at the first location). The control information may also include the movement start time to the destination and the service start time at the destination.

The movement control unit 112 executes movement control of the robot based on the control information. The movement control unit 112 may be provided outside the information processing apparatus 100 as illustrated in the FIG. 2, or may be provided inside the information processing apparatus 100.

Figure 3:
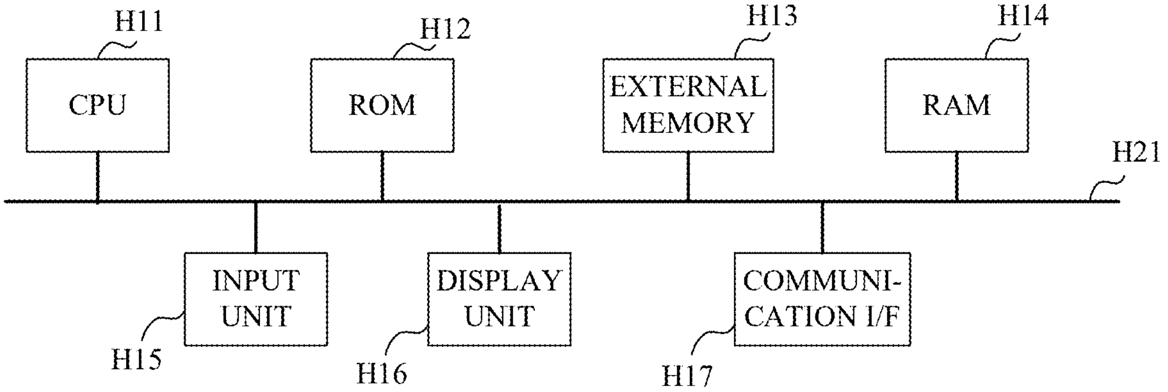
FIG. 3 illustrates the hardware configuration of the information processing apparatus according to this embodiment.

FIG. 3 illustrates the hardware configuration of the information processing apparatus 100. A central processing unit (CPU) H11 as a computer controls each device connected to a system bus H21, which will be described later. The CPU H11 functions as a user-provided condition acquiring unit 101, a maintenance information acquiring unit 102, a demand information acquiring unit 103, a specification information acquiring unit 104, and a movement control determining unit 105 (and a movement control unit 112 provided within the information processing apparatus 100) illustrated in FIG. 2.

A read only memory (ROM) H12 stores a basic input/output system (BIOS) program and a boot program. An external memory H13 stores applications and programs executed by the information processing apparatus 100, as well as various data and files. The external memory H13 is, for example, a memory such as a hard disk drive (HDD) or a solid state drive (SSD).

A random access memory (RAM) H14 is used as the main memory of the CPU H11. The RAM H14 also functions as a work area for the CPU H11. The CPU H11 loads a program stored in the ROM H12 or the external memory H13 into the RAM H14, executes it, and generally controls each device connected to the system bus H21.

An input unit H15 is an input apparatus such as a keyboard, a pointing device, or a robot controller, and receives input from a user. A display unit H16 displays the determination result by the information processing apparatus 100 in accordance with instructions from the CPU H11. The display unit H16 includes a liquid crystal display, a projector, an LED indicator, a head mount display capable of displaying virtual reality (VR), or the like. The display unit H16 may include a touch panel and function as the input unit H15. Associating input coordinates on the touch panel with display coordinates can form a GUI capable of various inputs by the user.

A communication I/F H17 communicates information with an unillustrated external device via a network. Communication with an external device can use various communication methods such as Ethernet, USB, serial communication, and wireless communication. The network may be a communication network such as a LAN or WAN, a cellular network such as LTE or 5G, or a wireless network, or a combination of these. In other words, the network may adopt any communication method for the physical layer as long as data can be transmitted and received.

Figure 4:
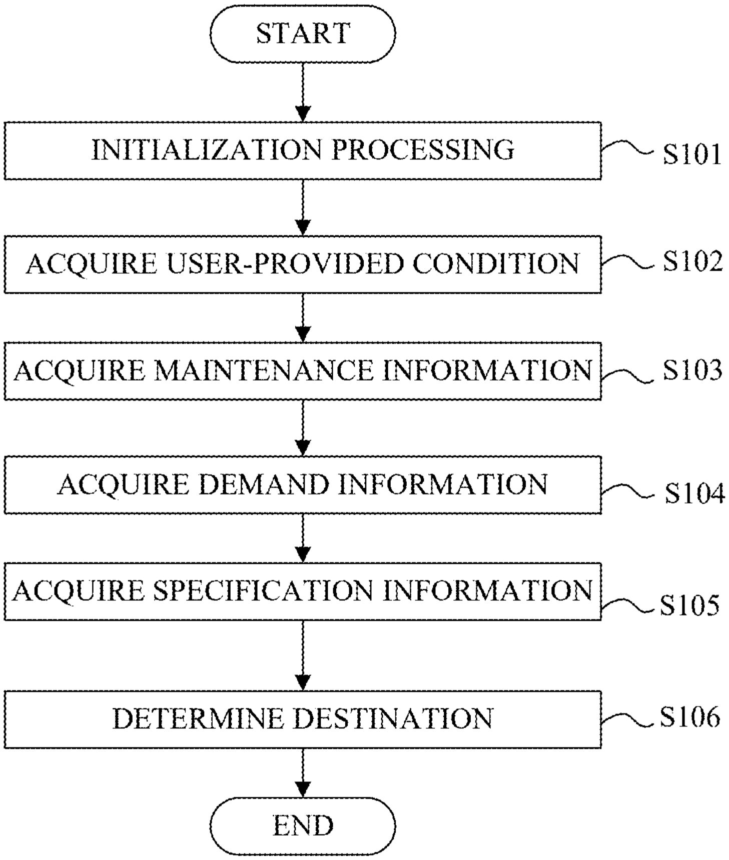
FIG. 4 is a flowchart illustrating the processing performed by the information processing apparatus according to this embodiment.

A flowchart in FIG. 4 illustrates the processing (information processing method) executed by the information processing apparatus 100 (CPU H11) in this embodiment according to a program. S stands for the step. This processing includes initialization (S101), acquisition of user-provided condition information (S102), acquisition of maintenance information (S103), acquisition of demand information (S104), acquisition of specification information (S105), and destination determination (S106). This processing is started when the user performs an operation to input a user-provided condition together with a service request (service location, designated date and time, etc.) into a client system for using the service.

In S101, the information processing apparatus 100 initializes itself. More specifically, the program is loaded from the external memory H13, and the information processing apparatus 100 is put into an operable state.

Next, in S102, the user-provided condition acquiring unit 101 acquires information on the user-provided condition for each service location and outputs it to the movement control determining unit 105. The user-provided condition includes whether or not the robot can stand by at the service location during free time other than the service time (after or before the service is provided) (first information), and whether or not the user can perform maintenance for the robot on standby at the service location (second information). The robot can stand by or receive maintenance at the service location, for example, in a case where the user managing the service location (user-managed location) permits it (selected permission). Maintenance includes, for example, charging the robot and cleaning the robot (dust disposal in a dust container in the cleaning robot, cleaning around the drive wheels of the robot, etc.).

Next, in S103, the maintenance information acquiring unit 102 acquires maintenance information and outputs it to the movement control determining unit 105. The maintenance information here is information indicating the remaining battery level of the robot and the free space in the dust container.

Next, in S104, the demand information acquiring unit 103 acquires demand information (third information) for predicting the demand for services in each region, and outputs it to the movement control determining unit 105. The demand information here is information indicating the history of the locations where services ordered in the past are provided.

Next, in S105, the specification information acquiring unit 104 acquires specification information (fourth information) and outputs it to the movement control determining unit 105. The specification information here is information indicating a type of robot. For example, there are two types of cleaning robots: robot sweepers and robot moppers (wet or water wipers).

Next, in S106, the movement control determining unit 105 determines control information including the travel destination of the robot based on the information on the user-provided condition, maintenance information, demand information, specification information, and order information, and outputs the control information to the movement control unit 112. The movement control unit 112 controls the movement of the robot based on the input control information.

The method of determining the (travel) destination of the robot is to calculate a score of suitability as a destination for each of a plurality of destination candidates, and determine the destination candidate with the highest score as the destination. The destination candidates include a plurality of service locations included in the order information stored in the order information memory 111 and service locations where service provision has already been completed.

The score calculation uses function fin the following equation (1):

$$f = C_1 \cdot C_2 W_2 \cdot (C_3 W_3 + C_4 W_4 + C_5 W_5 + 1) \tag{1}$$

where Cn (n=1, 2, . . . , 5) is information such as the user-provided condition, the type of service to be provided, and the degree of demand around the service location, and Wn is a weight for Cn, that is, the importance of each piece of information.

$C_1$ is information (first information) indicating whether or not the robot can stand by at a user-managed location including a service location among the user-provided condition, and is 1 if the standby is available, and 0 if the standby is not available. The movement control determining unit 105 does not select a service location with $C_1=0$ as a moving destination.

$C_2$ is information indicating the type of service (service content) to be provided at the service location, and is 1 for robot sweeper and 2 for robot mopper. The weight $W_2$ for $C_2$ is a value according to the type of robot included in the specification information, and if the service to be provided does not match the type of robot, $C_2W_2$ (the product) becomes 0, and the movement control determining unit 105 does not select that service location as a moving destination.

$C_3$ is information (third information) indicating the degree of service demand around the service location, and as the demand becomes higher, a larger value is set. The weight $W_3$ for $C_3$ is set large in a case where it is desired to actively direct the robot to a region with high demand for the service.

$C_4$ is information indicating whether the robot can be charged, and is 1 if charging is available and 0 if charging is not available. The weight $W_4$ for $C_4$ is the remaining battery level included in the maintenance information, and as the remaining battery level becomes lower, the weight $W_4$ is set larger. In a case where the remaining battery power is low, the movement control determining unit 105 gives priority to a service location where charging is available as a destination.

$C_5$ is information (second information) indicating whether or not the user can dispose of the garbage accumulated in the robot's dust container, and is 1 if the dust disposal is available and 0 if the dust disposal is not available. A weight $W_5$ for $C_5$ is set according to the free space (free capacity) of the robot's dust container contained in the maintenance information. More specifically, as the free capacity of the dust container reduces, the weight $W_5$ is set to be larger. In a case where the free capacity of the dust container is low, the movement control determining unit 105 gives priority to selecting a service location where garbage can be disposed of.

FIG. 5 illustrates example information regarding each of the above conditions for each user. Column (a) illustrates identification information (user ID) for identifying the user.

The user with user ID=1 is the user currently receiving service. Column (b) is information ($C_1$) indicating whether or not the robot can stand by at a user-managed location. Column (c) is information ($C_2$) indicating the type of service (service content) requested by the user. Column (d) is information ($C_3$) indicating the degree of demand for the service in the surrounding region. The level of demand in the surrounding region is predicted for each user from the history of service locations, which is the demand information, and the result is illustrated as information on the degree of demand for the service in the surrounding area (high, medium, low). Column (e) is information ($C_4$) indicating whether the user can charge the robot on standby. Column (f) is information ($C_5$) indicating whether the user can dispose of garbage (take out the trash).

The movement control determining unit 105 multiplies these pieces of information $C_2$ to $C_5$ by weights $W_2$ to $W_5$. Now assume that the robot is a robot sweeper having a low remaining battery level but sufficient free space in the dust container, and a destination with a high degree of demand for the service is prioritized. In this case, the service location of the user with user ID=4, which is (b) standby available (available), (c) sweep, (d) high demand, (e) charging available (available), and (f) dust disposal not available (not available (N/A)), has the highest score and is determined as the destination.

As described above, in this embodiment, if the robot can stand by at the previous or next service location during free time, the robot stands by at the user-managed location without returning to the station. As a result, returning to the station can be avoided and an efficient robot dispatch service can be provided. Furthermore, a proper destination for the robot can be determined according to various information (conditions) including whether standby is available or not.

First Variation

In the above embodiment, the movement control determining unit 105 determines the destination of the robot according to the user-provided condition, maintenance information, demand information, and specification information, but may determine the destination according to fewer types of information. More specifically, the destination may be determined according to only the user-provided condition and specification information. That is, the destination of the robot is determined according to information (first information) on whether the robot can stand by at the service location and whether the type of service to be provided matches the type of the robot (fourth information). In this case, all of the weights $W_3$, $W_4$, and $W_5$ included in equation (1) can be fixed to 0.

The embodiment determines the service location with the highest score using equation (1) as the destination, but may determine the station of the service provider as the destination. An example in which the destination is to be a station is a case where the robot is refused to stand by or receive maintenance by the user at any of the service locations. If standby at any of the service locations is refused, the robot has no place to stay and is to return to the station. In a case where there is almost no free space in the dust container in the robot, cleaning cannot be continued unless the trash accumulated in the dust container is disposed of, so in a case a user does not dispose of the trash, the robot is to return to the station.

Thus selecting a station as the destination according to the status of the robot can smoothly perform the robot dispatch service.

Second Variation

In the above embodiment, the maintenance information indicates the remaining battery level and the free space in the dust container, but is not limited to this example, and may be any information as long as it can be used to evaluate the degree of necessity for robot maintenance. More specifically, it may be information on the degree of wear of the part of the robot. In this case, the degree of necessity for maintenance is evaluated as high in a case where the degree of wear of the part is high. The degree of necessity for maintenance evaluated in this way is used as a weight in determining the destination, and the score reflects whether the user can replace the part. Thereby, the destination can be determined taking into account the degree of necessity for robot maintenance.

Third Variation

In the above embodiment, the demand information is information indicating the history of the locations where services ordered in the past are provided, but is not limited to this example, and may be any information as long as it can be used to predict demand. More specifically, it may be information on the number of companies or the number of households in the region where the service is provided, or information on income and population statistics provided by the government or local government. In a case where the demand information is information on the number of companies in the region and the service content is aimed at companies, it can be predicted that as the number of companies increases, the demand becomes higher. On the other hand, in a case where the demand information is income statistical information, it can be predicted that as the average income becomes higher, the opportunities to use the robot dispatch service increase in that region. In a case where the demand information is population statistical information, it can be predicted that a region having a higher population density has more users and thus a higher demand.

Fourth Variation

In the above embodiment, the specification information is information indicating the type of robot, but it is not limited to this example, and may be any information as long as it indicates the service ability of the robot. More specifically, in a case where the robot has removable equipment and the type or quality of the service to be provided changes depending on the equipment, the specification information may be information on the equipment. In such a case, the service to be provided and the robot can be properly matched by selecting the destination based on the type or quality of the service that has been ordered and the information on the equipment of the robot.

Fifth Variation

The above embodiment starts the processing of determining the destination illustrated in FIG. 4 in a case where the user performs an operation to input the user-provided condition into the client system, but this is not limited to this example, and the processing may be started when the user-provided condition changes. More specifically, in a case where the user's circumstances suddenly change after the service provision is completed and a period during which the robot can stand by at the user-managed location changes, the destination may be determined again. Thereby, a robot dispatch service can be smoothly provided even if the user-provided condition changes due to the user's circumstances.

Sixth Variation

The above embodiment requests, as the user-provided condition, information as to whether or not the user can do maintenance for the robot (charging or disposing of dust) while the robot is standing by at the user-managed location.

Instead of this, the service provider may pay a reward (incentive) to the user in a case where the user actually does maintenance for the robot on standby.

Whether or not the user has performed maintenance can be automatically detected by checking whether the battery level has increased or the free space in the dust container has increased at the user-managed location where the robot is standing by, through communication between the service provider and the robot. By determining the reward to be paid to the user in a case where such a reward-eligible action as charging or dust disposal is detected, the reward can be paid to the user without the user's notification.

Even if the user does not perform maintenance for the robot, a reward may be paid to the user simply by permitting the robot to stay.

Seventh Variation

Figure 6:
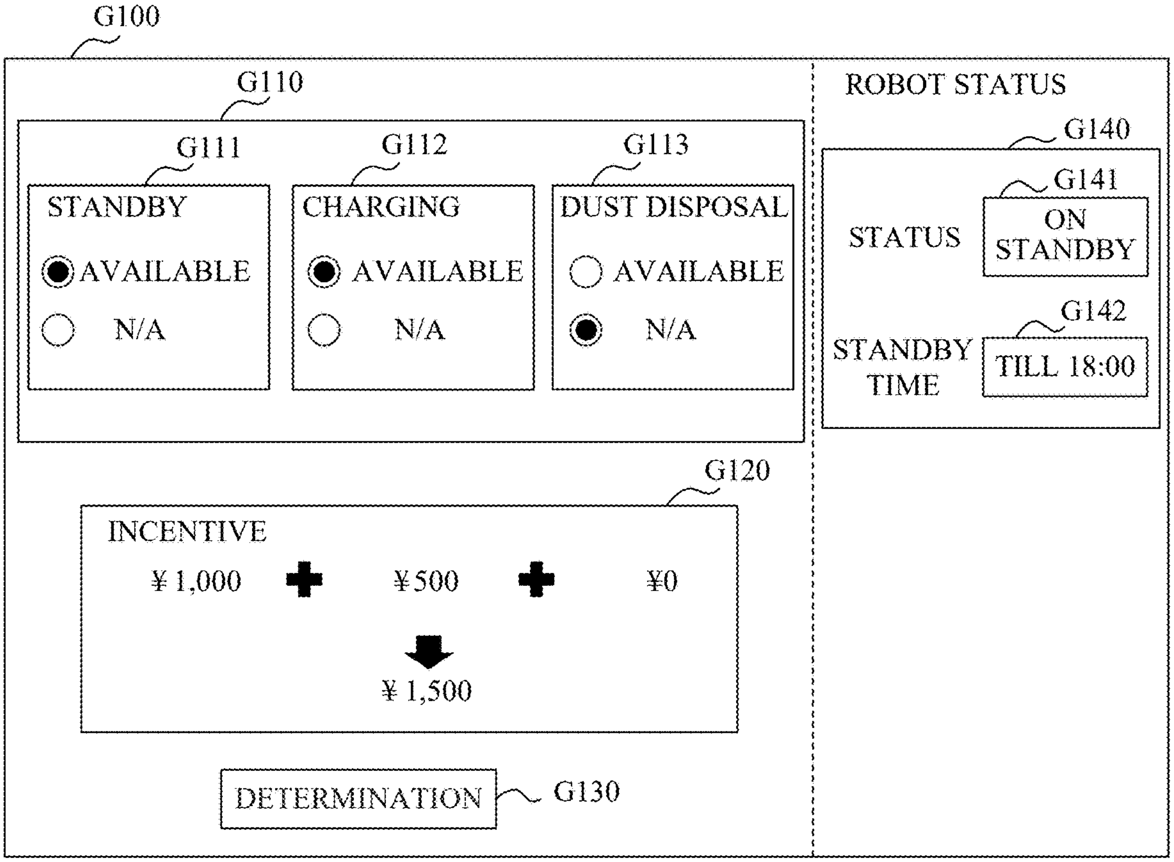
FIG. 6 illustrates a GUI for a user in this embodiment.

Through the user GUI (G100) illustrated in FIG. 6, the user may input the user-provided condition described in the above embodiment, and may be provided with display of the result of the control information determined by the information processing apparatus 100. The user GUI (G100) is displayed on a user-side electronic apparatus, such as a personal computer, smartphone, or tablet when the user logs in to the client system.

G110 is a user input section for the user to input (set) the user-provided condition. G111 is an input section for inputting whether or not the robot can stand by at the user-managed location, and G112 is an input section for inputting whether or not the robot can be charged at the user-managed location. G113 is an input section for inputting whether or not dust can be disposed of at the user-managed location. FIG. 6 illustrates the case where the user with user ID=4 illustrated in FIG. 5 has input user-provided condition.

G120 is an incentive display section that displays the incentive amount paid to the user for the user-provided condition input in the user input section G110. G130 is a determination (enter) button that allows the user to confirm the user-provided condition input in the user input section G110 and reflect it in the system.

G140 is a status display section that displays the robot status reflecting the control information determined by the information processing apparatus 100 (movement control determining unit 105) after the determination button G130 is operated. G141 is a status display section that displays the current status of the robot, i.e., whether it is standing by or moving. G142 is a standby time display section that displays the standby time (the start time of movement to the next destination) when the status is on standby.

By using such a user GUI, the user can easily input the user-provided condition to the client system and can check the current status and standby time of the robot. The incentive amount obtained according to the user-provided condition can also be clearly confirmed.

Eighth Variation

Figure 7:
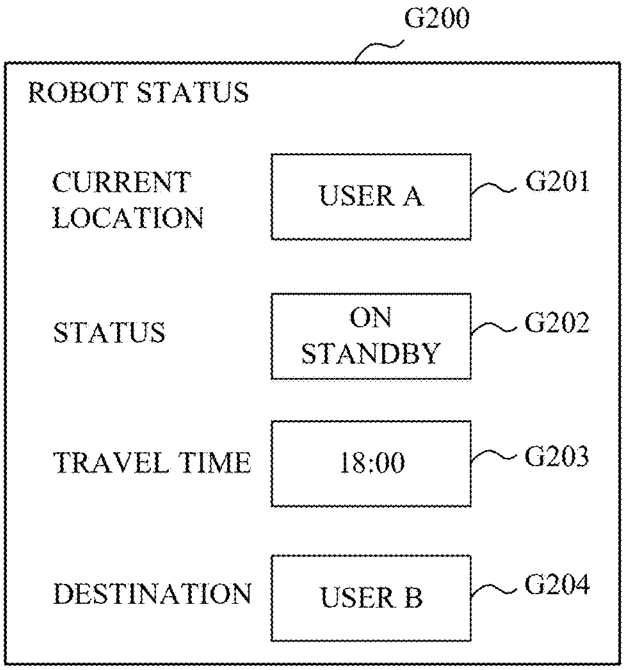
FIG. 7 illustrates a GUI for a service provider in this embodiment.

Through the service provider GUI (G200) illustrated in FIG. 7, the service provider may be able to confirm the status of the robot and the control information determined by the information processing apparatus 100. The service provider GUI (G200) is displayed on the service provider's personal computer as the information processing apparatus 100 or connected to the information processing apparatus 100.

G201 is a current location display section that displays the current location of the robot (such as user A corresponding to the first service location 11 illustrated in FIG. 1). G202 is a status display section that displays the current status of the robot, i.e., whether it is standing by or moving. G204 is a destination display section that displays the next destination of the robot (such as user B corresponding to the service location 12 illustrated in FIG. 1), and G203 is a moving time display section that displays the time when the robot moves to the next destination (the time corresponding to the standby time displayed in G143 in FIG. 6).

By using such a service provider GUI, the service provider can easily check the status of the robot and the moving schedule.

Ninth Variation

In the above embodiment, the movement control determining unit 105 mainly determines the destination of the robot after the service is provided, but may also determine the movement of the robot, including how the robot moves and stands by. That is, after the service is provided at the first service location, the robot may be determined to stand by at that service location and then move to the next service location or to move to the next service location without standby at the first service location and to stand by at the next service location.

Even in this case, if the standby at the first and next service locations is refused, the robot may be determined to return to the station after the service is provided at the first service location.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that the disclosure is not limited to the example embodiments. The scope of the following claims is to be accorded the broadest interpretation so as to encompass all such modifications and equivalent structures and functions. For example, the robot includes a drone, an automatic driving vehicle (bike, car, bus, ship, airplane, train, etc.), and other machines whose movement is remotely controllable.

This embodiment and each variation can provide an efficient robot dispatch service by minimizing unnecessary robot travel.

This application claims priority to Japanese Patent Application No. 2024-034485, which was filed on Mar. 7, 2024, and which is hereby incorporated by reference herein in its entirety.

What is claimed is:

1. An information processing apparatus configured to perform processing to control a movement of a robot in a case where the robot is sequentially moved to a plurality of locations to provide a service, the information processing apparatus comprising:

a processor configured to:

acquire first information indicating whether the robot can stand by each of the locations after or before the service is provided, make a determination regarding the movement of the robot after the service is provided, based on the first information, acquire second information indicating whether maintenance can be provided for the robot at each of the plurality of locations, and make the determination regarding movement of the robot after the service is provided based on the first information and the second information.

2. The information processing apparatus according to claim 1, wherein the processor is configured to determine a destination of the robot after the service is provided.

3. The information processing apparatus according to claim 2, wherein the processor is configured to determine a first location among the locations or a second location of at least one of the locations different from the first location as the destination after the service is provided at the first location.

4. The information processing apparatus according to claim 3, wherein the robot moves from a station to the first location, and wherein the destination determined by the processor after the service is provided at the first location includes the station.

5. The information processing apparatus according to claim 1, wherein the plurality of locations include a first location and a second location, and wherein the processor is configured to determine that the robot after the service is provided at the first location is to move to the second location after the robot stands by at the first location, or move to the second location without standing by at the first location and to stand by at the second location.

6. The information processing apparatus according to claim 5, wherein the robot moves from a station to the first location, and wherein the determination made by the processor includes moving the robot to the station after the service is provided at the first location.

7. The information processing apparatus according to claim 1, wherein the plurality of locations are locations managed by a user who has requested the service, and wherein the processor is configured to acquire the first information input by the user.

8. The information processing apparatus according to claim 1, wherein the maintenance includes at least one of charging of the robot or cleaning of the robot.

9. The information processing apparatus according to claim 1, wherein the processor is configured to:

acquire maintenance information including a type of the maintenance necessary for the robot or the type of the maintenance and a degree of necessity for each type of the maintenance, and make the determination regarding the movement of the robot after the service is provided based on the first information, the second information, and the maintenance information.

10. The information processing apparatus according to claim 1, wherein the plurality of locations are locations managed by a user who has requested the service, and wherein the processor is configured to acquire the second information input by the user.

11. The information processing apparatus according to claim 1, wherein the processor is configured to:

acquire third information indicating a service that the robot can provide, and make the determination regarding the movement of the robot after the service is provided based on whether the first information and information as to whether a service requested to be provided by the robot matches the service that the robot can provide indicated by the third information.

12. The information processing apparatus according to claim 1, wherein the processor is configured to control the robot based on a result of the determination.

13. The information processing apparatus according to claim 1, wherein the processor is configured to cause a display unit to display a result of the determination.

14. A system comprising:

the information processing apparatus according to claim 1; and the robot whose movement is controlled based on a result of the determination by the information processing apparatus.

15. An information processing apparatus configured to perform processing to control a movement of a robot in a case where the robot is sequentially moved to a plurality of locations to provide a service, the information processing apparatus comprising:

a processor configured to:

acquire first information indicating whether the robot can stand by each of the locations after or before the service is provided, make a determination regarding the movement of the robot after the service is provided, based on the first information, acquire second information for predicting a demand for the service around the plurality of locations, and make the determination regarding the movement of the robot after the service is provided based on the first information and the second information.

16. An information processing apparatus configured to perform processing to control a movement of a robot in a case where the robot is sequentially moved to a plurality of locations to provide a service, the information processing apparatus comprising:

a processor configured to:

acquire first information indicating whether the robot can stand by each of the locations after or before the service is provided, and make a determination regarding the movement of the robot after the service is provided, based on the first information, wherein the plurality of locations are locations managed by a user who has requested the service, and wherein the processor is configured to perform processing to pay a reward to the user who has provided at least one of a standby permission or a maintenance on the robot.

17. An information processing method performing processing to control a movement of a robot in a case where the robot is sequentially moved to a plurality of locations to provide a service, the information processing method comprising:

acquiring first information indicating whether the robot can stand by each of the locations after or before the service is provided, making a determination regarding the movement of the robot after the service is provided, based on the first information, acquiring second information indicating whether maintenance can be provided for the robot at each of the plurality of locations, and making the determination regarding the movement of the robot after the service is provided based on the first information and the second information.

18. A non-transitory computer-readable storage medium storing a program that causes a computer to execute the information processing method according to claim 17.

19. An information processing method performing processing to control a movement of a robot in a case where the robot is sequentially moved to a plurality of locations to provide a service, the information processing method comprising:

acquiring first information indicating whether the robot can stand by each of the locations after or before the service is provided, making a determination regarding the movement of the robot after the service is provided, based on the first information, acquiring second information for predicting a demand for the service around the plurality of locations, and making the determination regarding the movement of the robot after the service is provided based on the first information and the second information.

20. An information processing method performing processing to control a movement of a robot in a case where the robot is sequentially moved to a plurality of locations to provide a service, the information processing method comprising:

acquiring first information indicating whether the robot can stand by each of the locations after or before the service is provided, making a determination regarding the movement of the robot after the service is provided, based on the first information, and performing processing to pay a reward to a user who has provided at least one of a standby permission or a maintenance on the robot, wherein the plurality of locations are locations managed by the user who has requested the service.

* * * * *